(12) United States Patent
Gamper et al.

(10) Patent No.: US 10,129,684 B2
(45) Date of Patent: Nov. 13, 2018

(54) SYSTEMS AND METHODS FOR AUDIO CREATION AND DELIVERY

(71) Applicant: Microsoft Technology Licensing, LLC, Redmond, WA (US)

(72) Inventors: Hannes Gamper, Seattle, WA (US); Mark Richard Paul Thomas, Bellevue, WA (US); Ivan Jelev Tashev, Kirkland, WA (US); David Emerson Johnston, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/428,965

(22) Filed: Feb. 9, 2017

(65) Prior Publication Data
US 2017/0156017 A1    Jun. 1, 2017

Related U.S. Application Data

(63) Continuation of application No. 14/720,688, filed on May 22, 2015, now Pat. No. 9,609,436.

(51) Int. Cl.
*H04S 7/00* (2006.01)
*H04R 5/033* (2006.01)
(Continued)

(52) U.S. Cl.
CPC ............ *H04S 7/307* (2013.01); *G02B 27/017* (2013.01); *H04R 1/1075* (2013.01); *H04R 3/04* (2013.01);
(Continued)

(58) Field of Classification Search
CPC ....... H04R 5/0335; H04S 7/302; H04S 7/304; H04S 7/307; A61B 5/486

USPC ........ 379/395, 444; 381/1, 17, 26, 111, 309, 381/337, 74, 120, 376, 381, 385, 71.6, 381/314; 700/28; 715/727, 716; 2/209.13; 348/55, 569; 351/158;
(Continued)

(56) References Cited

U.S. PATENT DOCUMENTS 4,731,848 A    3/1988 Kendall et al.
4,864,619 A *  9/1989 Spates ..................... H04R 1/10
                                         381/309
(Continued)

FOREIGN PATENT DOCUMENTS

EP    2611216 A1    7/2013
WO    2013111038 A1    8/2013

OTHER PUBLICATIONS

Thomas R. P. Mark, "Application of Measured Directivity Patterns to Acoustic Array Processing", Retrieved From «http://www.aes-media.org/sections/uk/meetings/AESUK_lecture_1405.pdf», Jan. 2011, 48 Pages.

(Continued)

*Primary Examiner* — Gerald Gauthier
(74) *Attorney, Agent, or Firm* — Arent Fox LLP

(57) ABSTRACT

Systems and methods of providing an audio signal are disclosed herein. In one embodiment, a method of delivering an audio signal from a device toward a user's ear includes, for example, transmitting a filtered audio signal from a transducer positioned at a location on the device that is longitudinally spaced apart from an entrance of an auditory canal of the user's ear when the device is worn on the user's head.

22 Claims, 10 Drawing Sheets

(51) Int. Cl.
*H04S 1/00* (2006.01)
*H04R 1/10* (2006.01)
*H04R 3/04* (2006.01)
*H04R 29/00* (2006.01)
*G02B 27/01* (2006.01)

(52) U.S. Cl.
CPC ........... *H04R 5/033* (2013.01); *H04R 5/0335* (2013.01); *H04R 29/00* (2013.01); *H04S 1/00* (2013.01); *H04S 7/304* (2013.01); *H05K 999/99* (2013.01); *G02B 2027/0178* (2013.01); *H04R 29/001* (2013.01); *H04S 2420/01* (2013.01)

(58) Field of Classification Search
USPC ......... 455/351; 482/1; 600/46, 79, 301, 459; 601/2, 46, 79
See application file for complete search history.

(56) References Cited

U.S. PATENT DOCUMENTS

| | | | |
|---|---|---|---|
| 5,438,698 A * | 8/1995 | Burton | H01Q 1/276 2/209.13 |
| 5,587,936 A | 12/1996 | Levitt et al. | |
| 5,680,465 A * | 10/1997 | Boyden | H04R 3/12 381/309 |
| 5,715,323 A * | 2/1998 | Walker | H04R 1/10 351/123 |
| 5,881,390 A * | 3/1999 | Young | A41D 20/00 2/209.13 |
| 6,118,875 A | 9/2000 | Møller et al. | |
| 6,144,747 A | 11/2000 | Scofield et al. | |
| 6,243,476 B1 | 6/2001 | Gardner | |
| 6,427,018 B1 | 7/2002 | Keliiliki | |
| 6,631,196 B1 | 10/2003 | Taenzer et al. | |
| 6,631,197 B1 | 10/2003 | Taenzer | |
| RE38,351 E | 12/2003 | Iseberg et al. | |
| 6,990,205 B1 | 1/2006 | Chen | |
| 6,996,244 B1 | 2/2006 | Slaney et al. | |
| 8,270,616 B2 | 9/2012 | Slamka et al. | |
| 8,428,269 B1 | 4/2013 | Brungart et al. | |
| 8,545,013 B2 * | 10/2013 | Hwang | G02B 27/0176 351/158 |
| 8,693,703 B2 | 4/2014 | Rung | |
| 8,750,541 B1 | 6/2014 | Dong et al. | |
| 8,767,968 B2 | 7/2014 | Flaks et al. | |
| 8,768,496 B2 | 7/2014 | Katz et al. | |
| 8,787,584 B2 | 7/2014 | Nystrom et al. | |
| 2003/0007648 A1 | 1/2003 | Currell | |
| 2003/0044002 A1 * | 3/2003 | Yeager | H04S 1/005 379/444 |
| 2003/0059078 A1 * | 3/2003 | Downs, Jr. | H04R 1/083 381/381 |
| 2003/0138107 A1 | 7/2003 | Jin et al. | |
| 2004/0091119 A1 * | 5/2004 | Duraiswami | H04S 1/002 381/26 |
| 2004/0136538 A1 * | 7/2004 | Cohen | H04S 1/005 381/17 |
| 2006/0056638 A1 * | 3/2006 | Schobben | H04S 1/002 381/17 |
| 2006/0056639 A1 | 3/2006 | Ballas | |
| 2006/0240946 A1 * | 10/2006 | Wakabayashi | H04R 5/023 482/1 |
| 2007/0149905 A1 * | 6/2007 | Hanna | A61H 23/02 601/79 |
| 2007/0195963 A1 | 8/2007 | Ko et al. | |
| 2007/0253587 A1 | 11/2007 | Ostrowski | |
| 2008/0019554 A1 | 1/2008 | Krywko | |
| 2008/0044052 A1 * | 2/2008 | Whipple | A42B 1/245 381/376 |
| 2008/0107287 A1 * | 5/2008 | Beard | H04R 1/1016 381/111 |
| 2008/0199035 A1 | 8/2008 | Flechel et al. | |
| 2009/0046864 A1 | 2/2009 | Mahabub et al. | |
| 2009/0238371 A1 | 9/2009 | Rumsey et al. | |
| 2010/0008528 A1 * | 1/2010 | Isvan | H04R 1/1091 381/337 |
| 2010/0061580 A1 | 3/2010 | Tiscareno et al. | |
| 2011/0200215 A1 * | 8/2011 | Apfel | H04R 25/70 381/314 |
| 2011/0222700 A1 * | 9/2011 | Bhandari | G10K 11/178 381/71.6 |
| 2011/0251489 A1 * | 10/2011 | Zhang | A61B 8/0808 600/459 |
| 2012/0083717 A1 * | 4/2012 | Alleman | A61B 8/546 601/2 |
| 2012/0155689 A1 | 6/2012 | Milodzikowski et al. | |
| 2012/0237041 A1 | 9/2012 | Pohle | |
| 2012/0328107 A1 | 12/2012 | Nystrom et al. | |
| 2013/0022214 A1 | 1/2013 | Dickins et al. | |
| 2013/0089225 A1 * | 4/2013 | Tsai | H04R 1/1075 381/309 |
| 2013/0169767 A1 * | 7/2013 | Kim | H04N 13/0438 348/55 |
| 2013/0169878 A1 * | 7/2013 | Kim | H04N 5/66 348/569 |
| 2013/0177166 A1 | 7/2013 | Agevik et al. | |
| 2013/0178967 A1 | 7/2013 | Mentz | |
| 2013/0194107 A1 | 8/2013 | Nagata | |
| 2013/0208900 A1 | 8/2013 | Vincent et al. | |
| 2013/0259243 A1 | 10/2013 | Herre et al. | |
| 2013/0272546 A1 * | 10/2013 | Besgen, Sr. | H04R 1/025 381/120 |
| 2014/0079212 A1 * | 3/2014 | Sako | H04M 1/60 379/395 |
| 2014/0123008 A1 * | 5/2014 | Goldstein | H04M 1/05 715/716 |
| 2014/0133658 A1 | 5/2014 | Mentz et al. | |
| 2014/0159995 A1 | 6/2014 | Adams et al. | |
| 2014/0221779 A1 * | 8/2014 | Schoonover | A61B 5/4806 600/301 |
| 2014/0241540 A1 | 8/2014 | Hodges et al. | |
| 2014/0321661 A1 * | 10/2014 | Alao | H04R 1/105 381/74 |
| 2014/0334626 A1 | 11/2014 | Lee et al. | |
| 2014/0355792 A1 | 12/2014 | Nabata et al. | |
| 2014/0369519 A1 | 12/2014 | Leschka et al. | |
| 2015/0036864 A1 | 2/2015 | Ozasa et al. | |
| 2015/0150753 A1 * | 6/2015 | Racette | H03F 3/211 601/46 |
| 2015/0156579 A1 | 6/2015 | Lowry | |
| 2015/0293655 A1 * | 10/2015 | Tan | G06F 3/0486 715/727 |
| 2015/0304761 A1 | 10/2015 | Montazemi et al. | |
| 2015/0312694 A1 * | 10/2015 | Bilinski | H04S 7/302 381/1 |
| 2015/0326987 A1 * | 11/2015 | Marrin | H04R 1/1041 381/309 |
| 2016/0269849 A1 * | 9/2016 | Riggs | H04S 7/304 |
| 2016/0338636 A1 * | 11/2016 | IDrees | A61B 5/486 |
| 2017/0208413 A1 * | 7/2017 | Bilinski | H04S 7/302 |

OTHER PUBLICATIONS

"Non-Negative Matrix Factorization", Retrieved from «https://en.wikipedia.org/wiki/Non-negative_matrix_factorization», Mar. 26, 2014, 11 Pages.

"Non-Final Office Action Issued in U.S. Appl. No. 14/720,688", dated Jul. 28, 2016, 13 Pages.

"Notice of Allowance Issued in U.S. Appl. No. 14/720,688", dated Nov. 15, 2016, 9 Pages.

Ahrens, et al., "HRTF Magnitude Modeling Using a Non-Regularized Least-Squares Fit of Spherical Harmonics Coefficients on Incomplete Data", In Signal & Information Processing Association Annual Summit and Conference, Dec. 3, 2012, 5 Pages.

Algazi, et al., "The CIPIC HRTF Database", In Proceedings of IEEE Workshop on the Applications of Signal Processing to Audio and Acoustics, Oct. 21, 2001, pp. 99-102.

(56) References Cited

OTHER PUBLICATIONS

Andreopoulou, Areti, "Head-Related Transfer Function Database Matching Based on Sparse Impulse Response Measurements", In Doctoral Dissertation, New York University, Jan. 2013, 239 Pages.

Bilinski, Piotr, "HRTF Personalization using Anthropometric Features", Retrieved from «https://web.archive.org/web/20150921053235/http://research.microsoft.com/apps/video/dl.aspx?id=201707», Sep. 27, 2013, 1 Page.

Bosun, et al., "Head-Related Transfer Function Database and its Analyses", In Proceedings of Science in China Series G: Physics, Mechanics & Astronomy, vol. 50, Issue 3, Jun. 2007, 14 Pages.

Cheng, et al., "Introduction to Head-Related Transfer Functions (HRTFs): Representations of HRTFs in Time, Frequency, and Space", In Journal of the Audio Engineering Society, vol. 49, Issue 4, Apr. 2001, pp. 231-249.

Donoho, David L., "For Most Large Underdetermined Systems of Linear Equations of Minimal 11-Norm Solution is also the Sparsest Solution", In Technical Report No. 2004-9, Jul. 2004, 30 Pages.

Duda, et al., "Range Dependence of the Response of a Spherical Head Model", In Journal of Acoustical Society of America,vol. 104, Issue 5, Nov. 1998, pp. 3048-3058.

Fink et al., "Tuning Principal Component Weights to Individualize HRTFS", In Proceedings of IEEE International Conference on Acoustics, Speech and Signal Processing, Mar. 2012, 4 Pages.

Gamper, Hannes, "Head-Related Transfer Function Interpolation in Azimuth, Elevation, and Distance", In Journal of Acoustical Society of America, vol. 134, Issue 6, Dec. 2013, pp. EL547-EL553.

Grindlay, et al., "A Multilinear Approach to HRF Personalization", In Proceedings of 32nd International Conference on Acoustics, Speech, and Signal Processing, Apr. 2007, 4 Pages.

Haraszy, et al., "Improved Head Related Transfer Function Generation and Testing for Acoustic Virtual Reality Development", In Proceedings of the 14th WSEAS International Conference on Systems: Part of the 14th WSEAS CSCC Multi Conference, vol. 2, Jul. 2010, 6 Pages.

Hastie, et al., "The Elements of Statistical Learning Data Mining, Inference, and Prediction", In Springer—Statistics Series, Second Edition, Sep. 15, 2009, 764 Pages.

Hertsens, Tyll, "Headphone Measurement Procedures—Frequency Response", Retrieved From «https://web.archive.org/web/20110430001913/http://www.innerfidelity.com/content/headphone-measurement-proceedures-frequency-response», Apr. 15, 2011, 11 Pages.

Hoerl, et al., "Ridge Regression Biased Estimation for Nonorthogonal Problems", In Journal of Technometrics, vol. 42, Issue 01, Feb. 2000, 7 Pages.

Hu, et al., "HRTF Personalization Based on Artificial Neural Network in Individual Virtual Auditory Space", In the Proceedings of the Journal of Applied Acoustics, vol. 69, Issue 2, Feb. 2009, pp. 163-172.

Huang, et al., "Sparse Representation for Signal Classification", In Proceedings of Twenty-First Annual Conference on Neural Information Processing Systems, Dec. 2007, 8 Pages.

Jenison, "Synthesis of Virtual Motion in 3D Auditory Space", In Proceedings of IEEE 20th Annual International Conference of the Engineering in Medicine and Biology Society, vol. 3, Oct. 29, 1998, pp. 1-5.

Jot, Jean-Marc, "Efficient Models for Reverberation and Distance Rendering in Computer Music and Virtual Audio Reality", In Proceedings of International Computer Music Conference, Sep. 1997, 8 Pages.

Kohavi, Ron, "A Study of Cross-Validation and Bootstrap for Accuracy Estimaton and Model Selection", In Proceedings of the 14th International Joint Conference on Artificial Intelligence, vol. 2, Aug. 1995, 7 Pages.

Kukreja, et al., "A Least Absolute Shrinkage and Selection Operator (Lasso) for Nonlinear System Identification", In IFAC Proceedings, vols. 39, Jan. 1, 2006, 6 Pages.

Lemaire, et al., "Individualized HRTFs From Few Measurements: a Statistical Learning Approach", In Proceedings of IEEE International Joint Conference on Neural Networks (IJCNN), Jul. 31, 2005, pp. 2041-2046.

Li, et al. "HRTF Personalization Modeling Based on RBF Neural Network", In Proceedings of International Conference on Acoustics, Speech and Signal Proceeding, May 2013, 4 Pages.

Luo, et al., "Gaussian Process Data Fusion for the Heterogeneous HRTF Datasets", In Proceedings of IEEE Workshop on Applications of Signal Processing to Audio and Acoustics, Oct. 20, 2013, 4 Pages.

Masiero, et al., "Perceptually Robust Headphone Equalization for Binaural Reproduction", Presented at the 130th Convention of Audio Engineering Society, May 13, 2011, 7 Pages.

Mohan, et al., "Using Computer Vision to Generate Customized Spatial Audio", In Proceedings of the International Conference on Multimedia and Expo, vol. 3, Jul. 6, 2003, 4 Pages.

Otani, et al., "Numerical Study on Source-Distance Dependency of Head-Related Transfer Functions", In Journal Acoustical Society of America, vol. 125, Issue 5, May, 2009, pp. 3253-3261.

"International Search Report and Written Opinion Issued in PCT Application No. PCT/US2016/029275", dated Aug. 8, 2016, 16 Pages.

Rothbucher, et al., "Measuring Anthropometric Data for HRTF Personalization", In Sixth International Conference on Signal-Image Technology and Internet Based Systems, Dec. 15, 2010, 5 Pages.

Schonstein, et al., "HRTF Selection for Binaural Synthesis from a Database Using Morphological Parameters", In Proceedings of 20th International Congress on Acoustics, Aug. 23, 2010, 6 Pages.

Simonite, Tom, "Microsoft's "3-D Audio" Gives Virtual Objects a Voice", In MIT Technology Review, Jun. 4, 2014, 2 Pages.

Spagnol, et al., "On the Relation Between Pinna Reflection Patterns and Head-Related Transfer Function Features", In Proceedings of IEEE Transactions on Audio, Speech, and Language Processing, vol. 21, Issue 3, Mar. 2013, pp. 508-519.

Spors, et al., "Interpolation and Range Extrapolation of Head-Related Transfer Functions Using Virtual Local Nave Field Synthesis", In 130th Convention of Audio Engineering Society, May 13, 2011, 16 Pages.

Wagner, et al., "Towards a Practical Face Recognition System: Robust Alignment and Illumination by Sparse Representation", In Proceedings of IEEE Transactions on Pattern Analysis and Machine Intelligence, vol. 34, Issue 2, Feb. 2012, 15 Pages.

Wahab, et al., "Improved Method for Individualization of Head-Related Transfer Functions on Horizontal Plane Using Reduced Number of Anthropometric Measurements", In Journal of Telecommunications, vol. 2, Issue 2, May 27, 2010, 11 Pages.

Weissgerber, et al., "Headphone Reproduction Via Loudspeakers Using Inverse HRT-Filters", In Proceedings of NAG/DAGA, Jan. 2009, 4 Pages.

Wright, et al., "Robust Face Recognition via Sparse Representation", In IEEE Transactions on Pattern Analysis and Machine Intelligence, vol. 31, Issue 2, Feb. 2009, pp. 210-227.

Zotkin, et al., "HRTF Personalization Using Anthropometric Measurements", In the Proceedings of the IEEE Workshop on Applications of Signal Processing to Audio and Acoustics, Oct. 19, 2003, 4 Pages.

* cited by examiner

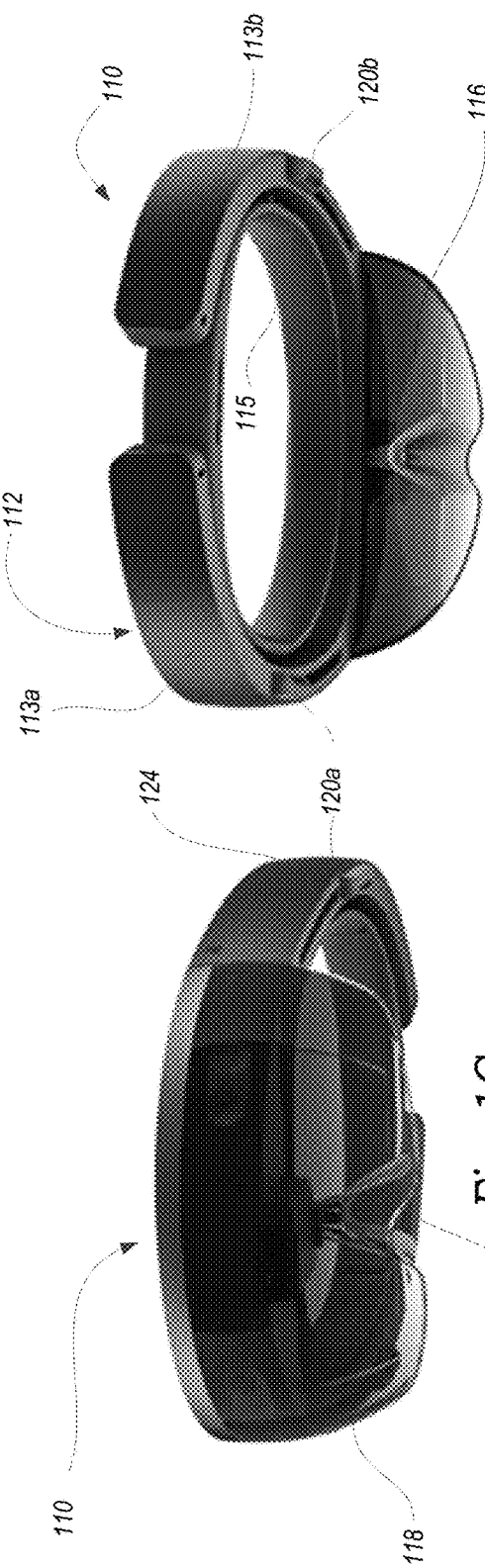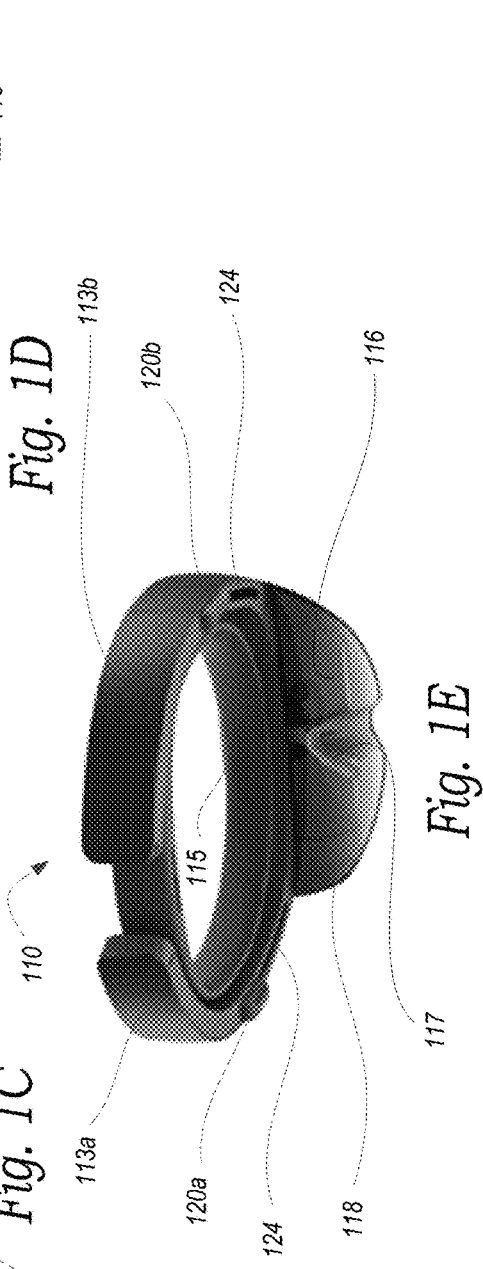

SYSTEMS AND METHODS FOR AUDIO CREATION AND DELIVERY

CROSS-REFERENCE TO RELATED APPLICATION

This is a continuation application of U.S. application Ser. No. 14/720,688, filed on May 22, 2015, entitled "SYSTEMS AND METHODS FOR AUDIO CREATION AND DELIVERY," which is hereby incorporated by reference in its entirety.

TECHNICAL FIELD

The described technology is generally directed to transmitting audio signals, and more specifically to systems and methods of delivering audio to a user's ear from one or more transducers spaced apart from the user's ear.

BACKGROUND

The human auditory system is able to determine a location of sound sources by analyzing acoustic cues in the sound signals reaching the entrance of both ears. Acoustic cues (e.g., an interaural time difference (ITD) and/or an interaural level difference (ILD)) can result from the filtering of the sound signals by the listener's head, torso, and pinnae. This filtering behavior can be described in terms of a user's head-related transfer function (HRTF). Applying an HRTF to a 3D audio signal provides the user with the spatial cues necessary for reproducing spatial audio over headphones worn in, on and/or near the user's ear.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter. In some embodiments, for example, an audio device (e.g., a headset) configured to be worn on a user's head includes a transducer carried by the audio device that is configured to be disposed at a location proximate the user's head and spaced apart from an ear of the user when the audio device is worn on the user's head. The audio device can further include electronics communicatively coupled to the transducer and configured to apply both a head related transfer function (HRTF) and a transducer position compensation filter to an audio signal to provide sounds having an enhanced frequency response at an entrance to the user's ear when the sounds are transmitted from the transducer toward the user's ear.

BRIEF DESCRIPTION OF THE DRAWINGS

FIGS. 1C-1E are front underside, rear underside and rear underside perspective views of the device of FIG. 1A.

DETAILED DESCRIPTION

Figure 1A:
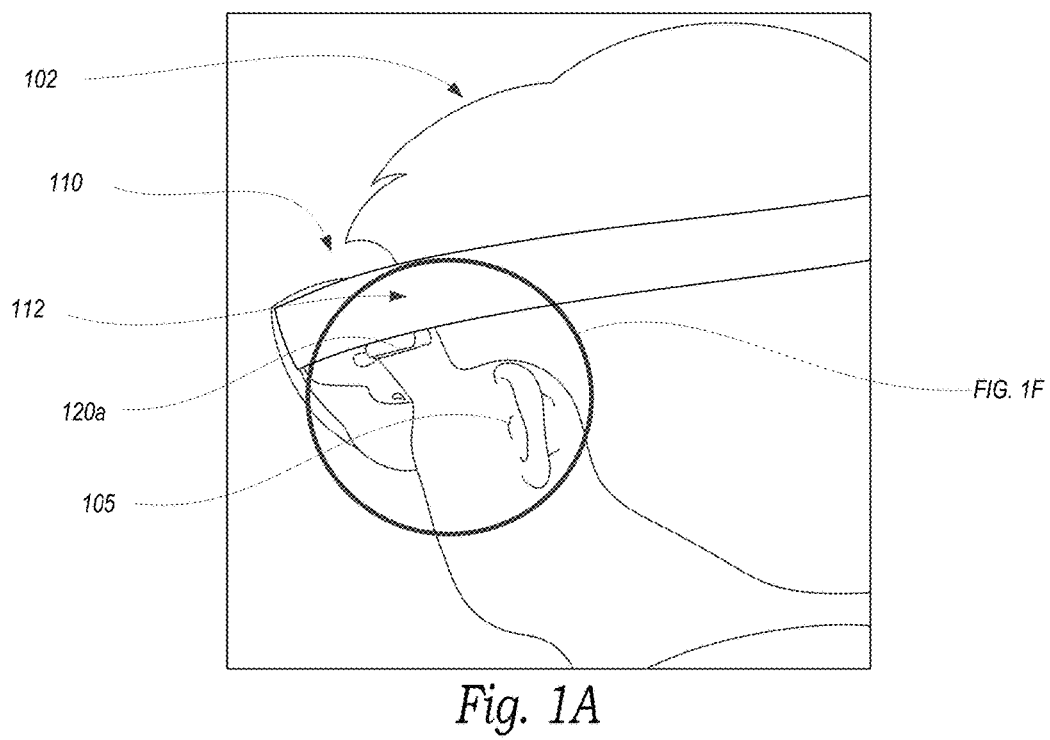
FIG. 1A is a rear side isometric view of a device shown worn on an user's head and configured in accordance with an embodiment of the disclosed technology.

The present disclosure describes various devices, systems, and methods of transmitting and/or delivering audio information to a user's ear. An audio signal having a user's head related transfer function (hereinafter HRTF) applied thereto can provide a realistic spatial listening experience when played back over headphones and/or earphones positioned on and/or immediately adjacent the entrance of a user's auditory canal. Playback of audio signals via transducers that are not immediately adjacent the entrance of the user's ear canal (e.g., transducers positioned between about 4 cm and 10 cm from the entrance of the user's ear canal) can result in a significant decrease in audio quality and realism. Reflections caused by physical structures of the user's ear can create distortions in the audio signal. The inventors have recognized that applying a transducer position compensation filter to an audio signal having a user's HRTF applied thereto can mitigate spectral coloring introduced by the off-center position of a transducer relative to the entrance of the user's ear canal.

In some embodiments, a method of delivering audio information to a user's ear includes receiving an audio signal (e.g., a spatial audio signal, a single-channel audio signal, a multichannel audio signal). The method further includes generating a filtered audio signal by applying a filter to the audio signal and transmitting the filtered audio signal toward the user's ear from a transducer carried by a headset configured to be worn on the user's head. The transducer, when the headset is worn on the user's head, is configured to be positioned at a location that is longitudinally spaced apart a distance (e.g., between about 2 cm and about 12 cm, between about 4 cm and about 10 cm, between about 6 cm and 8 cm and/or approximately one-half the distance between the user's ear and the user's eye on the same side of the user's head) from an entrance of an auditory canal of the user's ear. Applying the filter comprises altering a portion of the audio signal at a range of frequencies (e.g., between about 1 kilohertz (kHz) and about 10 kHz). The filtered audio signal is configured to provide sounds having a frequency spectrum that is substantially similar to a frequency spectrum of sounds emitted from a transducer positioned at the entrance of the ear canal. In some aspects, the method includes detecting the orientation and/or the distance (e.g., between about 4 cm and about 10 cm) between the transducer and the entrance of the user's auditory canal. In some aspects, the transducer is carried by a headband of the headset and is configured to move along a groove on the underside of the headband such that the transducer is moveable between at least a first position and a second position relative to the entrance of the user's auditory canal. In these aspects, the method also includes further comprising modifying the filter when the transducer is moved along the groove from the first position toward the second position. In some aspects, the method includes and generating a modified audio signal by applying a user's HRTF to the audio signal. In some aspects, the method also includes detecting one or more anthropometrics of the user (e.g., head width or head depth), matching one or more anthropometric features of the user with one or more HRTFs in an HRTF database and adjusting the filter based on the one or more HRTFs matched to the one or more anthropometrics of the user. In some aspects, the method further includes using anthropometric data to construct and/or adjust the filter applied to the modified audio signal.

In some embodiments, a device (e.g., a spatial audio playback device, a headset, an augmented reality or virtual reality device) includes a headset configured to be worn on a user's head and a transducer carried by the headset. The transducer is configured to be spaced apart a distance from an ear of the user when the headset is worn on the user's head. A memory is configured to store executable instructions; and a processor is configured to execute instructions stored on the memory. The instructions include instructions for providing an audio signal having a frequency spectrum that is substantially similar to a frequency spectrum of sounds emitted from a transducer positioned at an entrance to the user's ear. In some aspects, the distance is equal to about half a distance between the ear and an eye of the user on the same side of the user's head. In some aspects, the distance is between about one-half and one-fourth of a wavelength of sound at 1 kHz. In some aspects, the distance is between about 4 cm and about 10 cm. In some aspects, the transducer is configured to move along a circumference of the headset from a first position toward a second position relative to the user's ear. In some aspects, a sensor configured to provide signals indicative of movement of the transducer along the headset to the processor. In some aspects, the headset comprises a first headband portion opposite a second headband portion. In some aspects, the first headband portion and the second headband portions are adjustable between a first configuration and at least a second configuration. In these aspects, the instructions for providing the audio signal include instructions for applying a head related transfer function (HRTF) to the audio signal, and the instructions further include instructions for modifying the HRTF when the first headband portion and the second headband portion are adjusted from the first configuration toward the second configuration.

In some embodiments, a system (e.g., an augmented reality system) includes an augmented reality device (e.g., a headset) configured to be worn on a user's head and a transducer carried by the augmented reality device. The transducer is configured to be disposed at a location proximate the user's head and spaced apart from an ear of the user when the augmented reality device is worn on the user's head. The system further includes electronics (e.g., system electronics comprising a memory and a processor) communicatively coupled to the transducer and configured to apply both a head related transfer function (HRTF) and a transducer position compensation filter to an audio signal to provide sounds transmitted from the transducer toward the user's ear having a frequency response at an entrance of the user's ear substantially similar to a frequency response of sounds transmitted from a transducer positioned at the entrance of the user's ear. In some aspects, the transducer is positioned on the augmented reality device such a distance between the transducer and the entrance of the user's ear is between about 4 cm and about 10 cm. In some aspects, the system further includes a first sensor configured to produce a first electrical signal indicative of an anthropometric feature of the user and a second sensor configured to produce a second electrical signal indicative of a distance between the transducer and the entrance of the user's ear. In these aspects, the electronics are further configured to adjust the HRTF based on the first electrical signal and to adjust the transducer position compensation filter based on the second electrical signal.

These and other aspects of the disclosed technology are described in greater detail below. Certain details are set forth in the following description and in FIGS. 1A-8 to provide a thorough understanding of various embodiments of the disclosed technology. Other details describing well-known structures and systems often associated with spatial audio creation, delivery and related methods and systems have not been set forth in the following disclosure to avoid unnecessarily obscuring the description of the various embodiments.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1A. Many of the details, dimensions, angles and other features shown in the Figures are merely illustrative of particular embodiments of the disclosure. Accordingly, other embodiments can have other details, dimensions, angles, and features without departing from the spirit or scope of the present invention. In addition, those of ordinary skill in the art will appreciate that further embodiments of the invention can be practiced without several of the details described below.

Suitable Device

FIG. 1A is a rear side isometric view of a device 110 shown worn on an user's head 102 and configured in accordance with an embodiment of the disclosed technology. The device 110 (e.g., a headset, a personal listening device, an augmented reality device and/or a virtual reality device) includes a headband 112 configured to be worn on the user's head and a first transducer 120a carried by the headband 112 and positioned at a location spaced apart from an entrance to an ear 105 (i.e., the user's left ear). Unlike conventional headphones and earphones, the transducer 120a is configured to be carried by the headband 112 at a location that is not immediately proximate the entrance of the ear 105. In some embodiments, the transducer 120a is spaced apart from the entrance of the ear 105 by more than 2 cm. In some embodiments, a distance between the transducer 120a and the entrance of the ear 105 is between about 2 cm and 12 cm (e.g., between about 4 cm and about 10 cm, between about 5 cm and 9 cm or about 7 cm). In some embodiments, a distance between the transducer 120a and the entrance of the ear 105 is between about 20 and 80 millimeters.

As discussed in further detail below, the device 110 and the transducer 120a can be configured to receive an audio signal, apply an HRTF to the signal and further apply a transducer position compensation filter to the signal to deliver spatial audio to the entrance of the ear 105 having enhanced perceptual qualities (e.g., a relatively unmodified frequency response) compared to unfiltered spatial sounds (e.g., spatial sounds not having a transducer position compensation filter applied thereto) thereby providing a more realistic spatial audio experience.

Figure 1B:
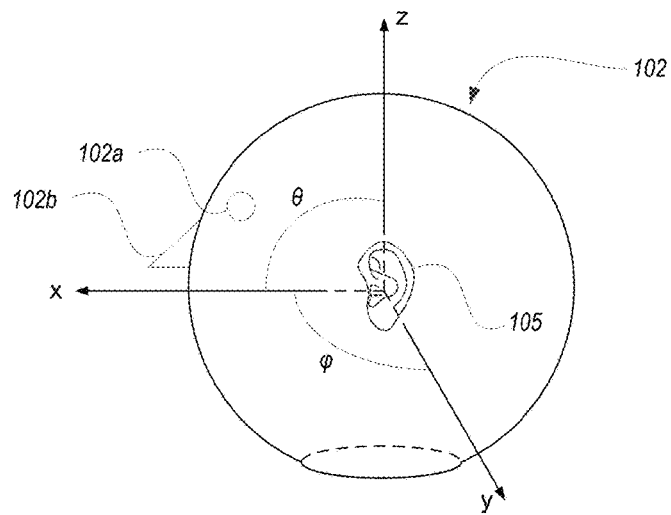
FIG. 1B is a schematic side view of a coordinate system of the user's head of FIG. 1A.

FIG. 1B is a schematic side view of a coordinate system of the user's head 102 of FIG. 1A showing the user's ear 105, an eye 102a (i.e., the user's left eye) and a nose 102b in relation to an XYZ coordinate system having an azimuthal angle $\varphi$ and an elevation angle $\theta$. The x-axis of FIG. 1B corresponds to a range dimension and the z-axis corresponds to an elevation dimension. A plane defined by the x and y axes corresponds to an azimuthal plane coplanar with an entrance to the ear 105.

FIGS. 1C-1E are front underside, rear underside and rear underside perspective views of the device 110. Referring to FIG. 1A and FIGS. 1C-1E together, the headband 112 includes a first headband portion 113a and a second headband portion 113b. An adjustable inner headband portion 115 allows adjustment of a size of the headband 112 to accommodate heads of various sizes and/or shapes. A display 116 is configured to output visual information (e.g., text, images and/or video) to the user. A nosepiece 117 is configured to rest on the user's nose 102b and a visor 118 is configured to protect portions of the device 110 and can also be configured to reduce an amount of light passing therethrough. A transducer 120b is positioned on an opposite side of the device 110 as the transducer 120. The transducers 120a and 120b are configured to move along a circumference of the headband 112 via corresponding grooves 124 formed in an underside surface of the device 110. In some embodiments, one or more sensors (not shown) in the grooves 124 are configured to produce signals indicative of movement of the transducers 120a and 120b along the grooves 124. In other embodiments, however, the transducers 120a and 120b have fixed positions relative to the device 110. In some embodiments, for example, the grooves 124 are configured to provide ventilation to electronics and/or other heat producing components in the device 110.

Figure 1F:
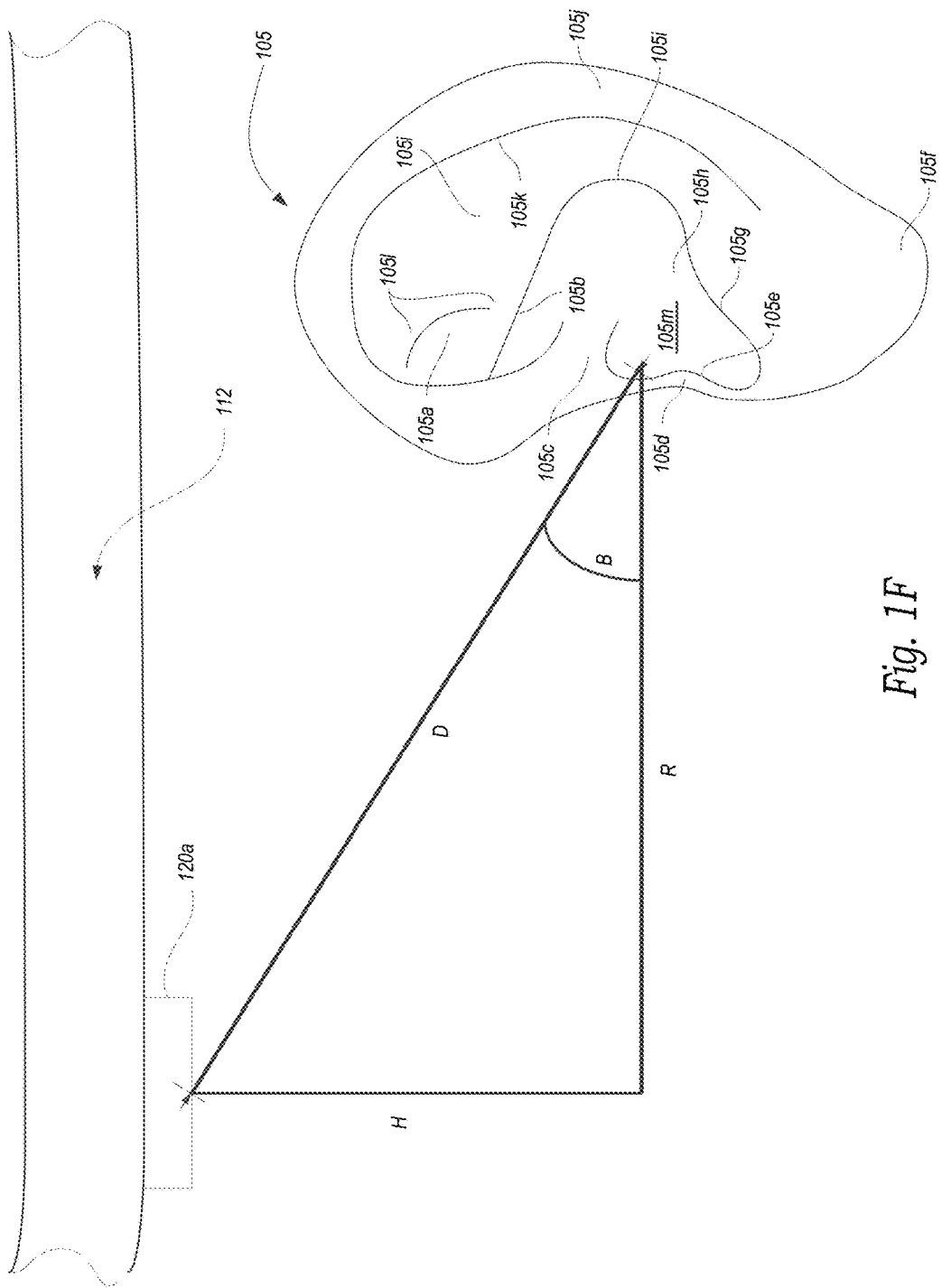
FIG. 1F is an enlarged view of a portion of the device of FIG. 1A.

FIG. 1F is an enlarged view of a portion of the device 110 and the ear 105 shown in FIG. 1A. Anatomic structures and features common found on the pinna of human ears are shown in FIG. 1F for the reader's reference. The ear 105 includes a fossa triangularis 105a, a cymba conchae 105b, a crux of the helix 105c, a tragus 105d, an ear canal 105e, an ear lobe 105f, an antitragus 105g, an antihelix 105i, a helix 105j, a scaphoid fossa 105k, a crura of an antihelix 105l and a cavum conchae 105m (i.e., the concha cavity and/or a vestibule or opening leading to the auditory canal of the ear 105). Additional anatomical structures are not shown for clarity. As shown in FIG. 1F, the transducer 120a is positioned on the headband 112 at a distance D from the cavum conchae 105m, spaced apart a range R in the x-direction (FIG. 1B) and a height H in the z-direction (FIG. 1B) at an angle B (e.g., 35-45 degrees) relative to the cavum conchae 105m. In some embodiments, the distance D can range between about 2 cm and about 12 cm or between about 4 cm and 10 cm. Moreover, the transducer 120a is shown in FIG. 1F at the height H in the z-direction above the cavum conchae 105m. In other embodiments, however, the transducer 120a can be positioned at any suitable position relative to the ear 105. In some embodiments, for example, the transducer 120a can be carried by the headset at a position below the cavum conchae 105m.

Suitable System

Figure 2:
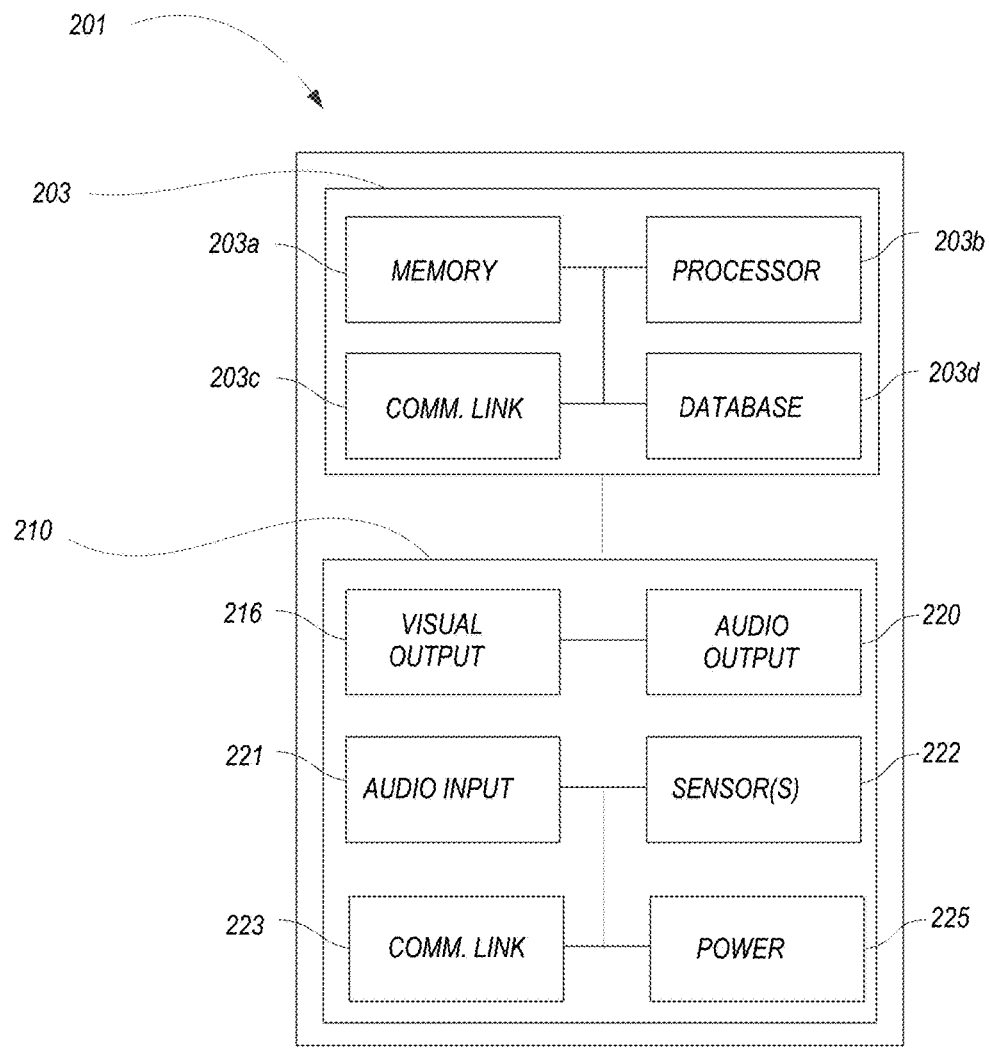
FIG. 2 is a schematic view of a system configured in accordance with an embodiment of the disclosed technology.

FIG. 2 and the following discussion provide a brief, general description of a suitable environment in which the technology may be implemented. Although not required, aspects of the technology are described in the general context of computer-executable instructions, such as routines executed by a general-purpose computer. Aspects of the technology can be embodied in a special purpose computer or data processor that is specifically programmed, configured, or constructed to perform one or more of the computer-executable instructions explained in detail herein. Aspects of the technology can also be practiced in distributed computing environments where tasks or modules are performed by remote processing devices, which are linked through a communication network (e.g., a wireless communication network, a wired communication network, a cellular communication network, the Internet, a short-range radio network (e.g., via Bluetooth)). In a distributed computing environment, program modules may be located in both local and remote memory storage devices.

Computer-implemented instructions, data structures, screen displays, and other data under aspects of the technology may be stored or distributed on computer-readable storage media, including magnetically or optically readable computer disks, as microcode on semiconductor memory, nanotechnology memory, organic or optical memory, or other portable and/or non-transitory data storage media. In some embodiments, aspects of the technology may be distributed over the Internet or over other networks (e.g. a Bluetooth network) on a propagated signal on a propagation medium (e.g., an electromagnetic wave(s), a sound wave) over a period of time, or may be provided on any analog or digital network (packet switched, circuit switched, or other scheme).

FIG. 2 is a schematic diagram of a system 201 configured in accordance with an embodiment of the disclosed technology. In the illustrated embodiment, the system 201 includes system electronics 203 coupled to an audio device 210 (e.g., the device 110 of FIGS. 1A and 1C-1E, an audio headset, a virtual reality headset, or an augmented reality headset). In some embodiments, the system electronics 203 may comprise one or more components that are partially or wholly incorporated into the device 210. In other embodiments, however, the system electronics 203 may include components that are remote from the device 210. The system electronics 203 may reside, for example, on a mobile device (e.g., a mobile phone, a tablet, a personal digital assistant) and/or a computer (e.g., a desktop computer, a laptop) communicatively coupled to the device 210.

The system electronics 203 includes several components including memory 203a (e.g., one or more computer readable storage modules, components, devices), one or more processors 203b, communication components 203c (e.g., a wired communication link and/or a wireless communication link (e.g., Bluetooth, Wi-Fi, infrared and/or another wireless radio transmission network)) and a database 203d configured to store to data (e.g., equations, filters, an HRTF database) used in the generation of spatial audio. In some embodiments, the system electronics 203 may include additional components not shown in FIG. 2. The memory 203a can be configured to store information (e.g., user information or profiles, environmental data, data collected from one or more sensors, media files) and/or executable instructions that can be executed by one or more processors 203b. As explained in further detail below with reference to FIGS. 3-5, the memory 203a can include, for example, instructions for enhancing audio signals to be output from the audio output 220 (e.g. the transducer 120a of FIG. 1A). The communication components 203c can also be configured to receive data (e.g., data containing spatial audio information for playback) from the one or more audio sources 107, the mobile device 108, the one or more computers 109, and/or another external device.

The device 210 is coupled to the system electronics 203 and includes a visual output (e.g., the display 116 of FIGS. 1D and 1E) an audio output 220 (e.g., the transducers 120a and 120b of FIGS. 1A and 1C-1E and/or one or more audio transducers (e.g., an electroacoustic loudspeaker, a piezoelectric transducer, an electrostatic transducer)), one or more audio inputs 221 (e.g., one or more microphones), one or more sensors 222 (e.g., one or more accelerometers, thermometers, hygrometers, blood pressure sensors, altimeters, gyroscopes, magnetometers, proximity sensors, barometers, hall effect sensors), and a communication component 223 (e.g., a wired communication link and/or a wireless communication link (e.g., Bluetooth, WiFi, infrared and/or another wireless radio transmission network)). A power supply 225 (e.g., one or more batteries and/or capacitors) can provide electrical power to components of the system 201 and/or the system electronics 203. The power supply 225 can be rechargeable, for example, via a power cable, inductive charging, and/or another suitable recharging method.

Figure 3:
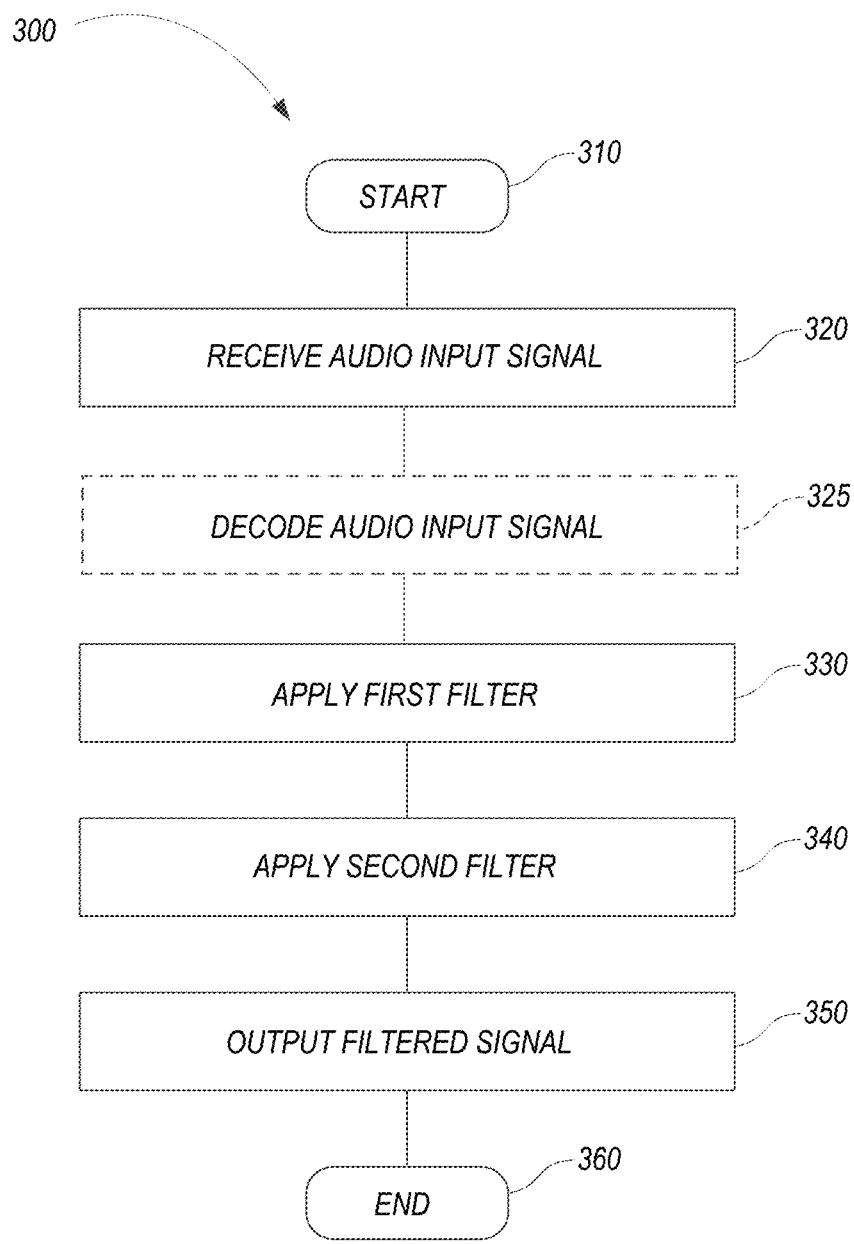
FIG. 3 is a flow diagram showing a process configured to produce an audio signal in accordance with an embodiment of the disclosed technology.

FIG. 3 is a flow diagram showing a process 300 configured to produce an audio signal in accordance with an embodiment of the disclosed technology. In some embodiments, the process 300 can comprise instructions stored, for example, on the memory 203a of the system 201 (FIG. 2) that are executable by the one or more processors 203b (FIG. 2). In some embodiments, portions of the process 300 are performed by one or more hardware components (e.g., a digital signal processor housed in and/or carried by the device 110). In some embodiments, portions of the process 300 are performed by a device external to the system 201.

The process 300 begins at block 310. At block 320, the process 300 receives one or more audio signals (e.g., spatial audio signals) from an external audio source (e.g., a media player, a mobile device, a computer, one or more remote servers) via a wired or wireless communication link (e.g., the communication component 203c and/or 223 of FIG. 2). In some embodiments, the process 300 decodes the audio signal at block 325 (e.g., using decoding instructions stored on the memory 203a and/or a hardware decoder). The process 300, for example, may convert the audio signal from a compressed format (e.g., mp3, .mp4, FLAC) to an uncompressed format. In some embodiments, the audio signals comprise a multichannel audio signal and/or a format comprising a spherical decomposition of a recorded sound field (e.g., B-format and/or ambisonics). In these embodiments, the process 300 may condition or otherwise prepare the audio signal for playback via one or more transducers (e.g., the transducers 120a and 120b of FIGS. 1C-1E). In other embodiments, however, the process 300 skips block 325 and proceeds to block 330.

At block 330, the process 300 applies a first filter to the received audio signal to generate a modified audio signal that incorporates filtering effects of physical structures of the user's body. The first filter can include, for example, an HRTF, a corresponding HRIR (head-related impulse response), and/or another suitable anatomical transfer function. In some embodiments, the first filter comprises a user's HRTF, which may be stored for example, on the memory 203a and/or in the database 203d (FIG. 2). In some embodiments, the first filter comprises a composite HRTF stored in an HRTF database (e.g., the database 203d of FIG. 2) and selected based on the user's anthropometrics (e.g., head shape, head width, head length). In some embodiments, as described below with reference to FIGS. 7 and 8, the first filter is calculated, modeled, or otherwise determined by measurements of the user's anthropometrics. The first filter, for example, may include an HRTF calculated based on measurements of the user's head size received from sensors (e.g., the one or more sensors 222 of FIG. 2) positioned on a headset (e.g., the device 110 of FIG. 1A and/or the device 210 of FIG. 2). The first filter may also be determined, for example, using optical measurements (e.g., images, laser measurements) of the user's head and/or pinna. In some embodiments, the first filter comprises an HRTF obtained using one or more of the techniques and/or methods disclosed in commonly-assigned U.S. patent application Ser. No. 12/903,610, now U.S. Pat. No. 8,767,968, both of which are incorporated by reference herein in their entireties.

At block 340, the process 300 applies a second filter such as a transducer position compensation filter to the modified audio signal generated at block 330. As described in more detail below with reference to FIGS. 4 and 5, the second filter can comprise a filter configured to be applied to the modified audio signal from block 330 such that a resulting filtered audio signal has an undistorted frequency spectrum at the entrance of the user's ear (e.g., the ear 105 of FIGS. 1A or 1F) when output from a transducer (e.g., the transducer 120a of FIG. 1A) that is positioned in the nearfield of the user's ear and spaced apart from the entrance thereof. In some embodiments, as described below with reference to FIG. 4, the transducer position compensation filter can be generated or calculated based, for example, on transducer characteristics and/or the user's anthropometrics. In some embodiments, the transducer position compensation filter may be predetermined (e.g., stored on the memory 203a and/or in the database 203d of FIG. 2).

At block 350, the filtered audio signal is output to one or more transducers (e.g., the transducer 120a and/or 120b of FIGS. 1C-1E and/or the audio output 220 of FIG. 2). In some embodiments, the transducer is spaced apart from an entrance to the user's ear canal. In other embodiments, however, the transducer is positioned immediately adjacent the entrance to the user's ear (e.g., in and/or on a pair of headphones or earphones). At block 360, the process 300 ends.

Figure 4:
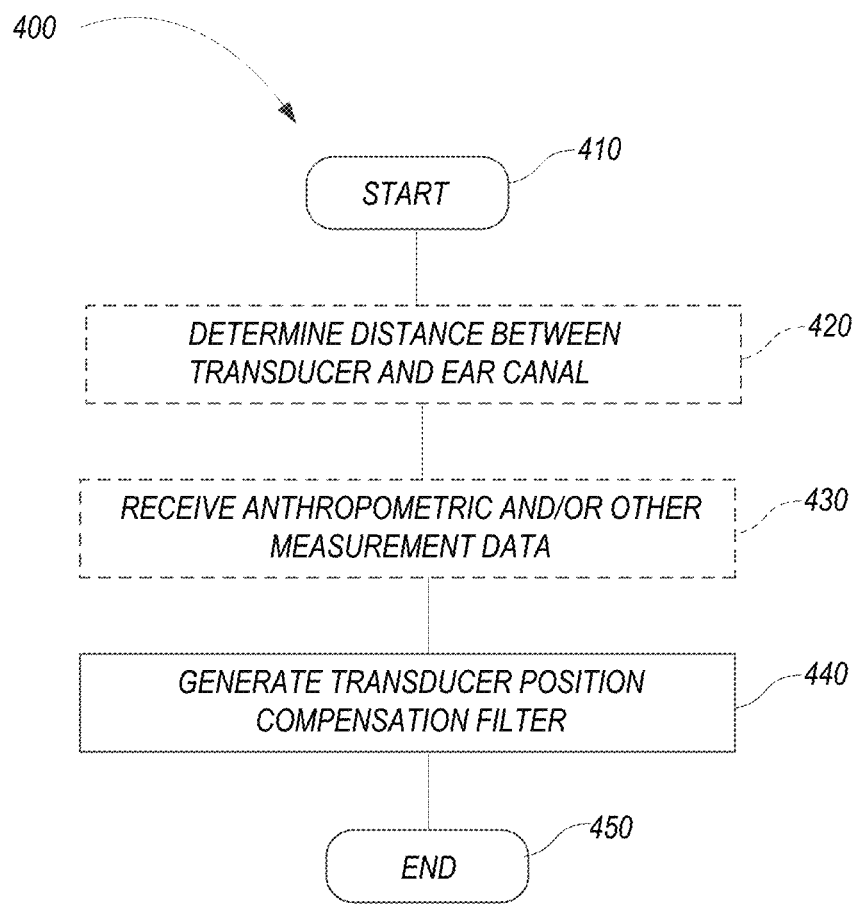
FIG. 4 is a flow diagram showing a process configured to filter an audio signal in accordance with an embodiment of the disclosed technology.

FIG. 4 is a flow diagram showing a process 400 for generating a transducer position compensation configured in accordance with an embodiment of the disclosed technology. The process 400 is configured to generate or otherwise output a transducer position compensation filter configured to enhance an audio signal (e.g., a spatial audio signal generated at block 330 of FIG. 3) transmitted from a transducer (e.g., the transducer 120a of FIG. 1) spaced apart from an entrance to a user's ear. In some embodiments, the process 400 comprises a portion and/or a subroutine of the process 300 (e.g., block 340 of FIG. 3). In some embodiments, the process 400 can comprise instructions stored, for example, on the memory 203a of the system 201 (FIG. 2) that are executable by the one or more processors 203b (FIG. 2). In some embodiments, portions of the process 400 may be performed by one or more hardware components (e.g., a digital signal processor housed in and/or carried by the device 110). In some embodiments, portions of the process 400 may be performed by a device external to the system 201.

The process 400 begins at block 410. At block 420, the process 400 optionally determines a distance, orientation and/or direction (e.g., the distance D of FIG. 1F) between a transducer (e.g., the transducer 120a of FIG. 1A) carried by a headset (e.g., the device 110 of FIG. 1A) and the entrance of a user's corresponding ear. In some embodiments, the distance and/or direction is determined using one or more sensors (e.g., the sensors 222 of FIG. 2). In some embodiments, the process 400 is configured to determine an updated distance and/or direction measurement if the transducer is moved on the headset (e.g. along the groove 124 of FIGS. 1C and 1E) relative to the user's ear. In some embodiments, the process 400 can receive user input corresponding to a distance and/or direction from a measurement performed by the user. In other embodiments, however, the distance and/or direction may be predetermined and the process 400 may skip block 410 and proceed to block 430.

At block 430, the process 400 can optionally receive anthropometric data (e.g., measurements of one or more user anthropometrics such as head shape, head size, ear position, ear shape and/or ear size) and/or other measurement data from sensors on the headset (e.g., the sensors 222 of FIG. 2) and/or other sensors positioned adjacent the user. In some embodiments, the measurement data may comprise audio measurements acquired by a microphone (e.g., the audio input(s) 221 of FIG. 2) positioned at and/or adjacent the user's ear. The process 400 can be configured, for example, to calculate an inverse filter based on the acquired audio measurements, which can be applied to an audio signal to mitigate the frequency distortions in an audio signal transmitted from a transducer (e.g., the transducer 120a of FIG. 1A and 1F) positioned near the user's ear. In other embodiments, however, the process 400 can skip blocks 420 and 430 and proceed directly to block 440.

At block 440, the process 400 generates a transducer position compensation filter to be applied to an audio signal such that the audio signal produces sounds having an enhanced frequency response at the user's ear compared to the audio signal of block 330 when the filtered audio signal is transmitted from a transducer positioned near the user's ear (e.g., between about 4 cm and about 100 cm from the user's ear) toward the user's ear. In some embodiments, as discussed below with reference to FIGS. 5 and 6, the transducer position compensation filter may comprise a filter configured to modify a particular range of frequencies of an audio signal emitted from the transducer. As those of ordinary skill in the art will appreciate, a transducer spaced apart from, but close to, a user's ear may produce a signal that is distorted, filtered, or otherwise affected by physical structures of the user's body. For example, sounds emitted from a transducer positioned off-center from the entrance to the user's ear can be distorted by pinna reflections. The process 400 can apply a transducer position compensation filter that at least partially mitigates the distortions caused by pinna reflections to provide an enhanced or smoother frequency response of sounds emitted by the transducer as they enter the user's ear. In some embodiments, the transducer position compensation filter generated at block 440 comprises an inverse filter calculated based on the measurements and/or calculations performed at blocks 420 and 430. In some embodiments, the transducer position compensation comprises any suitable filter that enhances the quality and/or realism of sounds having an HRTF applied thereto and emitted toward a user's ear from a transducer spaced apart from the user's ear. At block 450, the process 400 ends.

EXAMPLES

Figure 5:
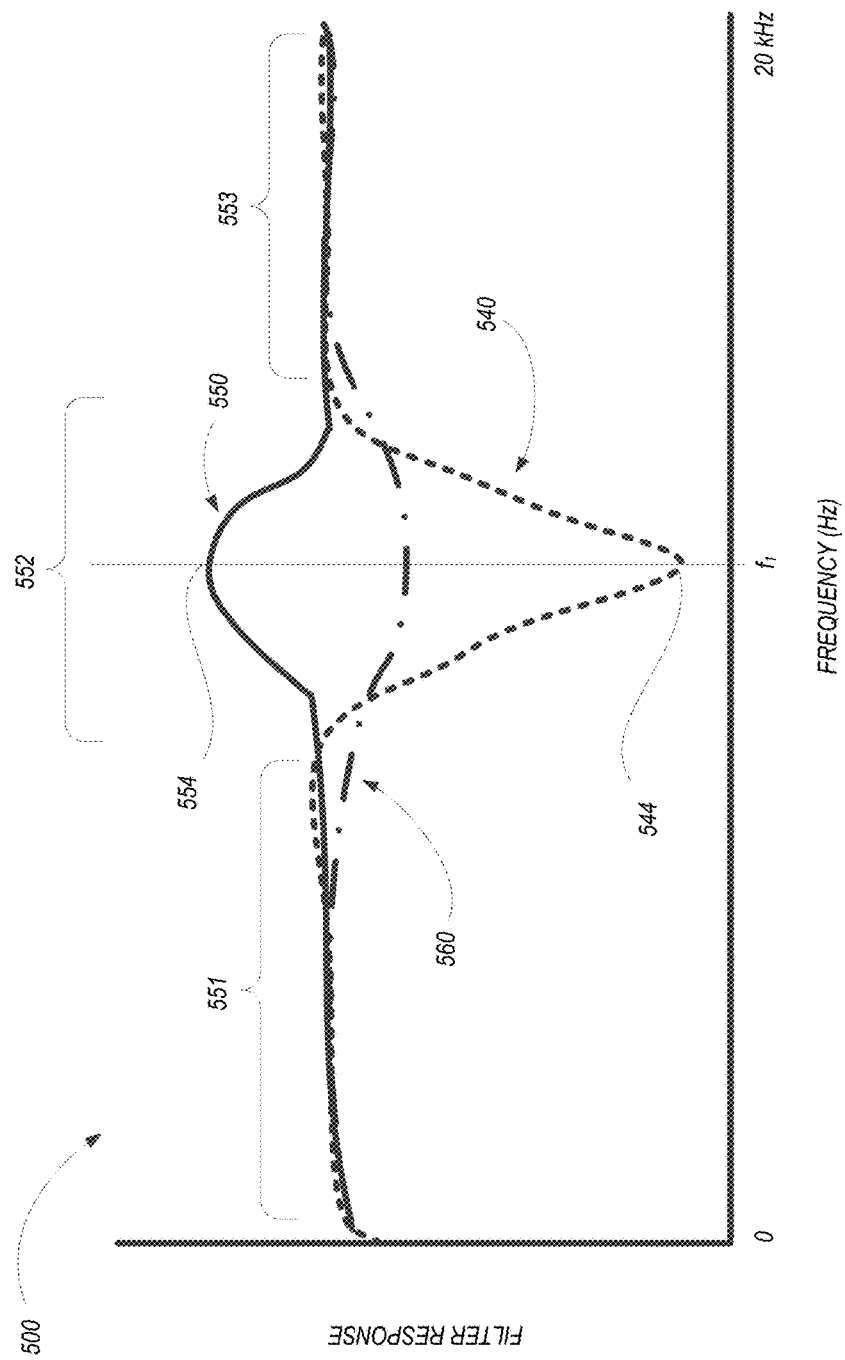
FIG. 5 is a graph showing an audio signal frequency response and a filter frequency response configured in accordance with an embodiment of the disclosed technology.

FIG. 5 is a graph 500 showing the frequency responses of an uncorrected audio path 540 as received or measured at the user's ear entrance (e.g., a spatial audio signal having an HRTF applied thereto without a transducer position compensation filter as discussed above with reference to block 330 of FIG. 3), a transducer position compensation filter 550 and a resulting frequency response of the audio path 560. The graph 500 includes a first frequency range 551 (e.g., between about 20 Hz and about 5 kHz), a second frequency range 552 (e.g., between about 4 kHz and about 8 kHz or between about 5 kHz to about 7 kHz), and a third frequency range 553 (e.g., between about 7 kHz to about 20 kHz). The second frequency range is centered at about a frequency $f_1$ (e.g., a frequency between about 5 kHz or 7 kHz). The audio signal path 540 has a notch 544 at the frequency $f_1$ caused by, for example, one or more reflections of sounds from the pinna of the user's ear. The filter 550 has a peak 554 centered at about the frequency $f_1$. Applying the filter 550 to the audio signal path 540, results in the filtered audio path 560 having an enhanced (e.g., smoother and/or less distorted) frequency response at the entrance of the user's ear compared to the initial frequency response 540.

Figure 6:
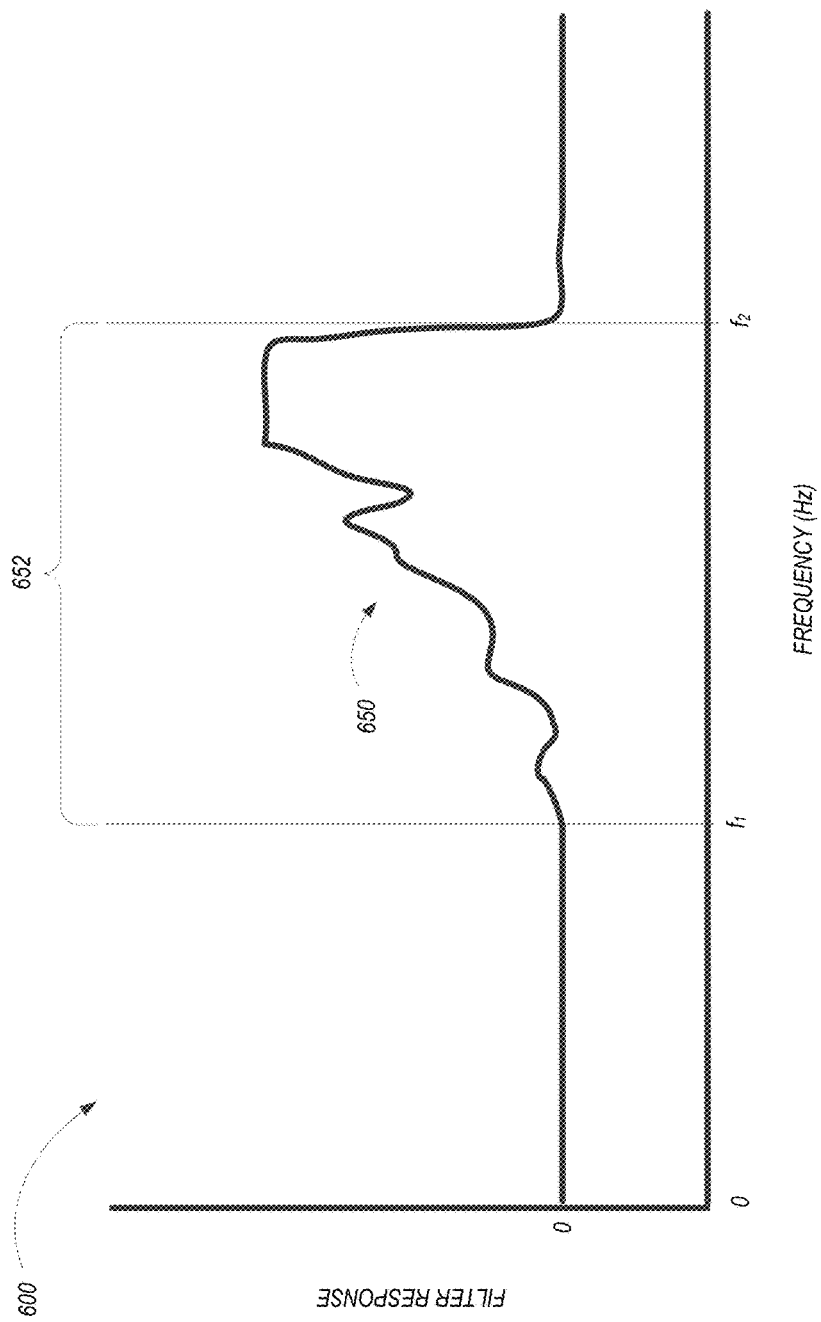
FIG. 6 is a graph showing a frequency response of a filter configured in accordance with an embodiment of the disclosed technology.

FIG. 6 is a graph 600 of a frequency response of another example of a transducer position compensation filter 650 configured in accordance with an embodiment of the present disclosure. The filter 650 can be applied to an audio signal at a range of frequencies 652 that extends from a first frequency $f_1$ (e.g., between about 800 Hz and about 2 kHz, or about 1 kHz) to a second a frequency $f_2$ (between about 8 kHz and about 12 kHz, or about 10 kHz). Applying the filter 650 to an audio signal that is to be transmitted from a transducer positioned at a location spaced apart from the entrance to the user's ear (e.g., the transducer 120a of FIG. 1A) can result in sounds transmitted from the transducer toward the user's ear having an enhanced frequency response compared to an unfiltered audio signal transmitted from the same transducer.

HRTF Determination

Figure 7:
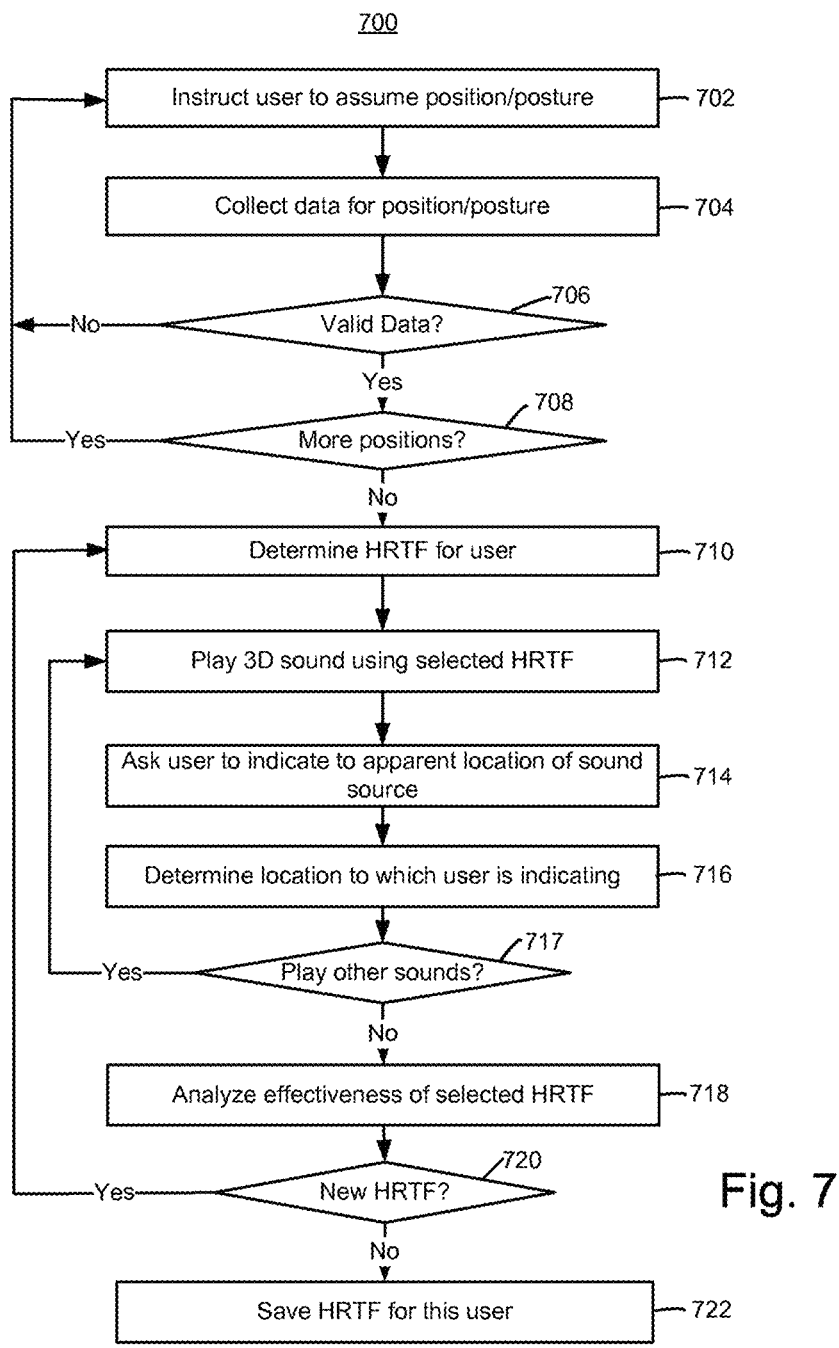
FIG. 7 is a flow diagram showing a process configured to determine a Head Related Transfer Function (HRTF) of a user in accordance with an embodiment of the disclosed technology.

As discussed above with reference to FIG. 3, in some embodiments, the HRTF for a user is determined from a library of HRTFs based on the anthropometrics or physical characteristics of the user. These physical characteristics may be determined based on input from sensors. FIG. 7 is a flow diagram of a process 700 of determining an HRTF for a particular user. In some embodiments, the process 700 is at least partially stored on the memory 203a and executed by the one or more processors 203b of FIG. 2. The resulting HRTF may be used, for example, in step 330 of the process 300 of FIG. 3. Note that the HRTF may be determined at any time. As one example, the HRTF is determined once for the user and stored for use again and again. Of course, it is possible to revise the HRTF (e.g., select new HRTF).

At block 702, the process 700 instructs the user to assume a certain position or posture. For example, the process 700 instructs the user to look to the left. At block 704, the process 700 collects data with the user in that position. At block 706, the process 700 determines whether the data is valid. For example, if the process 200 was expecting data for a right ear, then the process 200 determines whether the data matches what is expected for a right ear. If not, the step(s) at block 702 may be repeated such that the user is again instructed to assume the correct posture. If the data is valid (block 706 is yes), then the process 700 determines whether there are more positions/postures for the user to assume. Over the next iterations the user might be asked to look straight ahead, look right, etc. Data could be collected for a wide variety of positions.

When suitable data is collected, the process 700 proceeds to block 710 to determine a HRTF for the user. In some embodiments, there is a library of HRTFs from which to select. These HRTFs may be associated to various physical characteristics of users. Examples include, but are not limited to, head size and width, pinna characteristics, body size. For example, a specific HRTF may be associated with specific measurements related to head size and pinna. The measurements might be a range or a single value. For example, one measurement might be head width, which could be expressed in terms of a single value or a range. The process 700 may then select an HRTF for the user by matching the user's physical characteristics to the physical characteristics associated with the HRTFs in the library. Any technique may be used to determine a best match. In some embodiments, the process 700 interpolates to determine the HRTF for the user. For example, the user's measurements may be between the measurements for two HRTFs, in which case the HRTF for the user may be determined by interpolating the parameters for the two HRTFs.

Next, the process 700 may perform additional steps to verify that this HRTF determination is good, and perhaps select a better HRTF for this user. At block 712, the system plays an audio signal for the user. This may be played through a headset worn by the user (e.g., the device 110 of FIG. 1A). At block 714, the process 700 may ask the user to point to the apparent source of the audio signal. At block 716, the process 700 determines the location to which the user is pointing using a camera and/or one or more other sensors. In some embodiments, the process 700 may repeat blocks 712-716 using other sounds, until the process 700 determines (at block 717) that sufficient data is collected.

At block 718, the process 700 determines the effectiveness of the HRTF. For example, the process 700 determines how accurately the user was able to locate the virtual sounds. The system then determines whether a different HRTF should be determined for this user. If so, the new HRTF is determined by returning to block 710. The process 700 may repeat block 712-718 until a satisfactory HRTF is determined.

At block 722, the process 700 stores the user's HRTF. Note that this is not necessarily the last HRTF that was tested in process 700. That is, the process 700 may determine that one of the HRTFs that was tested earlier in the process 700 might be superior. Also note that more than one HRTF could be stored for a given user. For example, process 700 could be repeated for the user wearing glasses and not wearing glasses, with one HRTF stored for each case.

Figure 8:
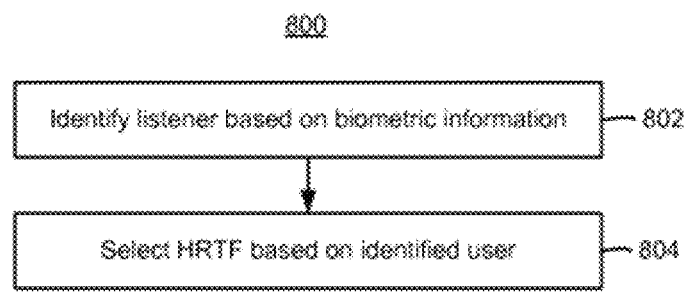
FIG. 8 is a flow diagram showing a process configured to select an HRTF of a user in accordance with an embodiment of the disclosed technology.

As noted, the process of determining detailed characteristics of the user such that an HRTF may be stored for the user might be done infrequently—perhaps only once. FIG. 8 depicts a flow diagram of one embodiment of a process 800 of selecting an HRTF for a user based on detailed characteristics that were previously collected. For example, process 700 may be performed once prior to process 800. However, process 800 might be performed many times. At block 802, the process 800 identifies the user using biometric information. Note that this information is not the same information collected during process 700. However, it is possible that there might be some overlap of information. In one embodiment, the system is able to recognize the listener based on, for example, facial recognition.

At block 804, the process 800 selects a suitable HRTF for the user identified at block 802. In one embodiment, an HRTF that was stored for the user by the process 700 is selected. In another embodiment, the process 800 may select the HRTF based on user characteristics collected by the process 700. If desired, these stored detailed user characteristics may be augmented by information that is presently collected. For example, the process 800 may select a different HRTFs based on whether the user is wearing, for example, a hat and/or glasses.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method of delivering an audio signal toward an ear of a user from a transducer carried by a device configured to be worn on a head of the user, comprising:
   receiving an audio signal;
   generating a transducer position compensation filter based on a distance between a first location of the transducer and a second location proximal to an entrance of an auditory canal of the ear of the user when the device is worn on the head of the user, wherein the transducer is mounted on the device, wherein the first location is longitudinally spaced apart from the second location, and wherein the transducer position compensation filter modifies the audio signal to mitigate distortions from the first location being off-center relative to the entrance of the auditory canal of the ear of the user;
   applying at least one filter, including the transducer position compensation filter, to the audio signal to produce a filtered audio signal; and
   transmitting the filtered audio signal from the transducer toward the ear of the user.

2. The method of claim 1, further comprising detecting the distance of the transducer relative to the entrance of the auditory canal.

3. The method of claim 1 wherein the distance is between about 2 cm and about 10 cm.

4. The method of claim 1 wherein applying the at least one filter to the audio signal comprises altering a portion of the audio signal at one or more frequencies to provide sounds at an entrance to the ear of the user having an enhanced frequency response relative to an unfiltered audio signal that is transmitted from the transducer toward the ear of the user.

5. The method of claim 4 wherein the one or more frequencies are between about 1 kHz and 10 kHz.

6. The method of claim 4, further comprising:
   determining a physical characteristic of the ear of the user; and
   adjusting the one or more frequencies based on the determined physical characteristics of the ear of the user.

7. The method of claim 1 wherein the transducer is configured to be positioned at a location substantially equidistant from between an eye of the user and the entrance of the auditory canal when the device is worn on the head of the user.

8. The method of claim 1 wherein applying the at least one filter to the audio signal further comprises applying a head related transfer function (HRTF) of the user to the audio signal.

9. The method of claim 8, further comprising:
   detecting one or more anthropometrics of the user;
   matching one or more anthropometrics of the user with one or more HRTFs in an HRTF database; and
   adjusting the at least one filter applied to the audio signal using the one or more HRTFs matched to the one or more anthropometrics of the user.

10. The method of claim 1, wherein the filtered audio signal has a less distorted frequency response at the entrance of the auditory canal of the ear of the user compared to a frequency response of the audio signal transmitted without applying the transducer position compensation filter.

11. The method of claim 1, further comprising:
receiving, from a first sensor, a first electrical signal indicative of an anthropometric feature of the user;
receiving, from a second sensor, a second electrical signal indicative of the distance between the transducer and the entrance of the auditory canal of the ear of the user;
wherein applying the at least one filter to the audio signal further comprises applying a head related transfer function (HRTF) of the user to the audio signal;
adjusting the HRTF based on the first electrical signal; and
adjusting the transducer position compensation filter based on the second electrical signal.

12. A device configured to be worn on a head of a user, comprising:
a transducer mounted on the device;
a memory configured to store executable instructions; and
at least one processor configured to execute instructions stored on the memory, the instructions including instructions for;
receiving an audio signal;
generating a transducer position compensation filter based on a distance between a first location of the transducer and a second location proximal to an entrance of an auditory canal of an ear of the user when the device is worn on the head of the user, wherein the first location is longitudinally spaced apart from the second location, and wherein the transducer position compensation filter modifies the audio signal to mitigate distortions from the first location being off-center relative to the entrance of the auditory canal of the ear of the user;
applying at least one filter, including the transducer position compensation filter, to the audio signal to produce a filtered audio signal; and
transmitting the filtered audio signal from the transducer toward the entrance of the auditory canal of the ear of the user.

13. The device of claim 12 wherein the memory further includes instructions for applying the at least one filter to the audio signal such that the filtered audio signal has a generally flat frequency response at the entrance of the auditory canal of the ear of the user.

14. The device of claim 12 wherein the distance is between the ear and an eye of the user on the same side of the head of the user.

15. The device of claim 12 wherein the distance is between about 4 cm and about 10 cm.

16. The device of claim 12 wherein the device further comprises a first headband portion opposite a second headband portion, and wherein the transducer is carried by the first headband portion.

17. The device of claim 16 wherein the first headband portion and the second headband portion are adjustable between a first configuration and at least a second configuration, wherein the instructions for applying the at least one filter include instructions for applying a head related transfer function (HRTF) to the audio signal, and wherein the instructions further include instructions for modifying the HRTF when the first headband portion and the second headband portion are adjusted from the first configuration toward the second configuration.

18. A computer program product comprising a non-transitory computer readable storage medium storing computer usable program code executable to perform operations for delivering audio toward an ear of a user from a transducer carried by a device configured to be worn on a head of the user, the operations comprising:
generating a transducer position compensation filter based on a distance between a first location of the transducer and a second location proximal to an entrance of an auditory canal of the ear of the user when the device is worn on the head of the user, wherein the transducer is mounted on the device, wherein the first location is longitudinally spaced apart from the second location, and wherein the transducer position compensation filter modifies the audio signal to mitigate distortions from the first location being off-center relative to the entrance of the auditory canal of the user's ear;
applying at least one filter, including the transducer position compensation filter, to the audio signal to produce a filtered audio signal; and
transmitting the filtered audio signal from the transducer toward the entrance of the audio canal of the ear of the user.

19. The computer program product of claim 18 wherein the computer readable storage medium further includes computer usable program code executable to perform operations including applying the at least one filter to the audio signal such that the filtered audio signal has a generally flat frequency response over a range of frequencies at the entrance of the audio canal of the ear of the user.

20. The computer program product of claim 19 wherein the range of frequencies is between about 1 kHz and 10 kHz.

21. The computer program product of claim 19 wherein the computer readable storage medium further includes computer usable program code executable to perform operations including:
receiving an electrical signal indicative of an anthropometric feature of the user, wherein applying the at least one filter to the audio signal further comprises applying a head related transfer function (HRTF) of the user to the audio signal, the HRTF determined at least in part on the electrical signal.

22. The computer program product of claim 18 wherein the distance is between about 4 cm and about 10 cm.

* * * * *